V. J. O'BRIEN.
REMOVABLE KEY CHUCK.
APPLICATION FILED NOV. 26, 1912.
1,086,783.
Patented Feb. 10, 1914.
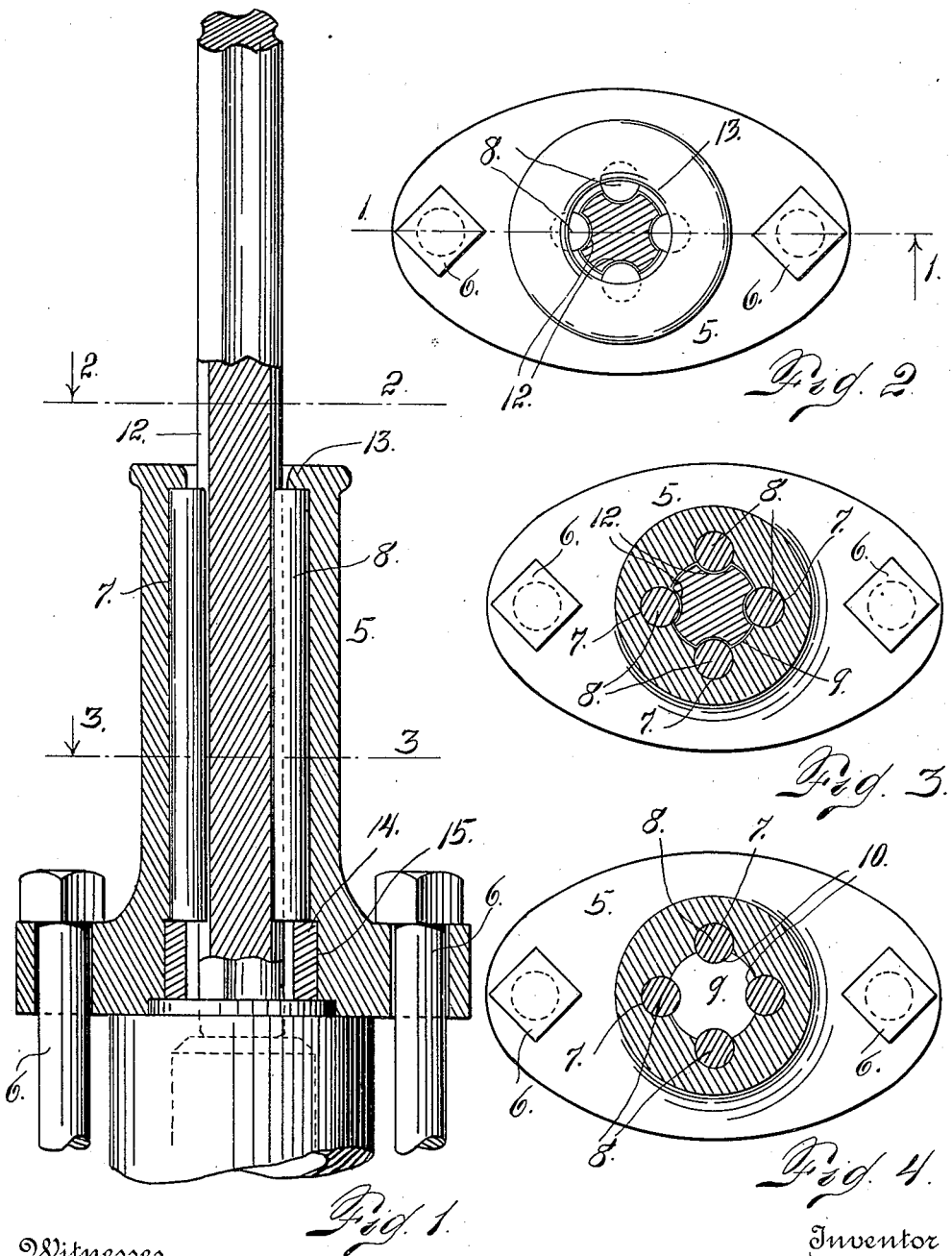
Witnesses
Otto E. Hoddick
C. H. Rossner
Inventor
V. J. O'Brien
By [signature]
Attorney

UNITED STATES PATENT OFFICE.

VINCENT JOHN O'BRIEN, OF DENVER, COLORADO.

REMOVABLE KEY-CHUCK.

1,086,783.

Specification of Letters Patent.

Patented Feb. 10, 1914.

Application filed November 26, 1912. Serial No. 733,613.

*To all whom it may concern:*

Be it known that I, VINCENT JOHN O'BRIEN, a citizen of the United States, residing in the city and county of Denver and State of Colorado, have invented certain new and useful Improvements in Removable Key-Chucks; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in drill steel chucks, my object being to provide removable wearing parts for these chucks so that only these wearing parts need be thrown away when they become worn, thus saving the body of the chuck and greatly reducing the expense of operation as compared with the chuck constructions heretofore in vogue.

Heretofore, where cruciform drill steels have been employed, the interior of the chuck has been formed of counterpart shape to receive the drill steel. In rotating the steel, which result is accomplished by imparting partial rotary movements to the entire drill structure, the chuck, after a short time, becomes so worn by its action upon the drill steel that there is considerable lost motion, with the result that the operator will not give the body of the drill the necessary movement to impart the required rotation to the drill steel in order to obtain the best results; and, finally, the worn chuck must be entirely discarded and a new chuck substituted. The wear upon the chuck is accelerated from the fact that the rock cuttings, during stoping work, in forming up holes, work between the drill steel and the chuck, necessarily producing a grinding action between the adjacent parts, At present the renewal of worn chucks forms the greatest item of expense in connection with stoping machines.

Having briefly outlined my improved construction, I will proceed to describe the same in detail, reference being made to the accompanying drawing, in which is illustrated an embodiment thereof.

In this drawing: Figure 1 is a section taken through the chuck end of a rock drilling machine showing the drill steel in place and partly sectionized. In this view, the chuck is equipped with my improved wearing keys or members. This is a section taken on the line 1—1, Fig. 2. Fig. 2 is a cross section taken through the drill steel on the line 2—2, viewed in the direction of the arrow, whereby a front end elevation of the machine is obtained. Fig. 3 is a cross section taken on the line 3—3, Fig. 1. Fig. 4 is a similar section taken through the chuck with the drill steel removed, the wearing keys, however, being in place.

The same reference characters indicate the same parts in all the views.

Let the numeral 5 designate a drill chuck which is connected with the body of the machine by means of bolts or rods 6. This chuck is provided with longitudinal grooves 7 adapted to receive removable keys 8, which, as illustrated in the drawing, are cylindrical in shape and are adapted to be inserted and removed in an endwise direction only, since the segments which project into the drill steel opening 9 of the chuck are less than half of the cross sectional areas of the keys. These interiorly projecting segments 10 fit into the longitudinal grooves 12 of the drill steel and constitute wearing parts. In other words, these segments are virtually the only parts of the chuck which are subjected to wear, and after they have become worn to such an extent that the lost motion makes it impracticable to obtain the best results by the use of the machine, the chuck may be removed and these keys driven out, after which new keys may be substituted, and the chuck replaced by virtue of this change, equal in every respect to a new chuck.

In order to prevent the wearing keys 8 from escaping at the forward extremity of the chuck, the grooves 7 in the chuck are closed at the forward extremity of the latter as shown at 13. In the rear the wearing keys are retained in place by means of a ring 14 which engages a circular recess 15 formed at the base of the chuck and extending outwardly slightly beyond the outward limits of the grooves 7.

When the keys become worn it is only necessary to remove the chuck, detach the ring 14 and drive the keys out in a rearward direction. New keys are substituted in the reverse manner, after which the chuck is again put in place, as heretofore explained.

A drill steel cruciform in cross section is preferable in form, for the reason that it greatly facilitates the sharpening operation, as the edges of the cutting extremity of the steel are in alinement with the ribs of the steel adjacent the grooves of the latter, and in drawing out the front extremity of the steel during the sharpening operation, this is an important feature. However, from the standpoint of wear upon the chuck the cruciform shape is disadvantageous and for this reason the portion of the steel which enters the chuck is often reformed to make a chuck-entering shank square in cross section, the chuck opening being of counterpart shape. The reformation of these drill steels in the manner just stated is a source of no small expense, and the necessity therefor is entirely avoided by the employment of my present invention, since by the use of the removable wearing keys the body of the chuck is practically relieved from all wear, and the keys, when worn, may be removed and new ones substituted at a very small cost.

Having thus described my invention, what I claim is:

1. A drill steel chuck having grooves arranged adjacent the opening for the drill steel and having removable wearing keys inserted in said grooves and extending into the drill steel opening whereby said keys are adapted to enter the grooves of a cruciform drill steel, substantially as described.

2. A chuck for drill steels having grooves formed adjacent the opening for the steel and communicating with said opening, the said grooves being parallel with the said opening, and removable wearing keys inserted in said grooves and having parts extending into the drill steel opening and adapted to receive the grooves of a drill steel.

3. A drill steel chuck having circular grooves formed therein parallel and adjacent the drill steel opening, the grooves communicating with the said opening, and cylindrical wearing keys inserted in said grooves and having longitudinal segments extending into the said opening whereby they are adapted to enter the grooves of a cruciform drill steel.

4. A drill steel chuck having circular grooves formed therein parallel with and adjacent the drill steel opening, the grooves communicating with the said opening, cylindrical wearing keys inserted in said grooves and having longitudinal segments extending into the said opening, whereby they are adapted to enter the grooves of a cruciform drill steel, the forward extremities of the grooves in the chuck being closed to prevent the escape of the wearing keys in a forward direction.

5. A drill steel chuck having longitudinally disposed grooves communicating with the drill steel opening, and removable wearing keys inserted in said grooves and extending into the chuck opening and adapted to enter the grooves of a cruciform drill steel, the forward extremities of the chuck grooves being closed to prevent the escape of the wearing keys at the forward extremity of the chuck, the rear extremity of the chuck being circumferentially recessed, and a ring, or collar, fitted into said recess to prevent the escape of the wearing keys in a rearward direction.

6. A drill steel chuck having cylindrical grooves formed therein, extending parallel with the drill steel opening in the chuck and communicating therewith, the cross sectional area of each chuck groove being greater than half the area of a circle.

7. A drill steel chuck having cylindrical grooves formed therein, extending parallel with the drill steel opening in the chuck and communicating therewith, the cross sectional area of each chuck groove being greater than half the area of a circle, and cylindrical wearing keys inserted in said grooves and having longitudinal segments projecting into the drill steel opening in the chuck, substantially as described.

In testimony whereof I affix my signature in presence of two witnesses.

VINCENT JOHN O'BRIEN.

Witnesses:
MAY CLEMENTS,
OTTO E. HODDICK.